United States Patent
Fair et al.

(10) Patent No.: US 9,063,842 B1
(45) Date of Patent: Jun. 23, 2015

(54) TECHNIQUE FOR INTEGRATING VTL TAPE POOLS WITH MTREE QUOTAS

(71) Applicant: EMC Corporation, Hopkinton, MA (US)

(72) Inventors: Robert L. Fair, Cary, NC (US); Imran Khan, Raleigh, NC (US); Pranay Singh, Cupertino, CA (US)

(73) Assignee: EMC Corporation, Hopkinton, MA (US)

( * ) Notice: Subject to any disclaimer, the term of this patent is extended or adjusted under 35 U.S.C. 154(b) by 187 days.

(21) Appl. No.: 13/891,789

(22) Filed: May 10, 2013

(51) Int. Cl.
G06F 3/06 (2006.01)
G06F 12/02 (2006.01)
G06F 12/08 (2006.01)

(52) U.S. Cl.
CPC .......... *G06F 12/023* (2013.01); *G06F 12/0891* (2013.01); *G06F 3/0686* (2013.01); *G06F 3/0682* (2013.01)

(58) Field of Classification Search
CPC .............................. G06F 3/0682; G06F 3/0686
USPC ................................... 711/112, 147, 170, 154
See application file for complete search history.

(56) References Cited

U.S. PATENT DOCUMENTS

| | | | |
|---|---|---|---|
| 7,539,813 B1 * | 5/2009 | Todd et al. | 711/108 |
| 2004/0153614 A1 * | 8/2004 | Bitner et al. | 711/162 |
| 2006/0031653 A1 * | 2/2006 | Todd et al. | 711/170 |
| 2006/0123189 A1 * | 6/2006 | Bitner et al. | 711/111 |
| 2006/0282636 A1 * | 12/2006 | Yamamoto et al. | 711/170 |
| 2011/0185135 A1 * | 7/2011 | Fujii et al. | 711/162 |

* cited by examiner

*Primary Examiner* — Than Nguyen
(74) *Attorney, Agent, or Firm* — Blakely, Sokoloff, Taylor & Zafman LLP

(57) ABSTRACT

A system and method for enforcing quotas in a data storage system. In one embodiment, a method includes the operations of receiving a first request that defines a storage quota for a pool of virtual tapes that is allocated to a user entity; defining the storage quota for the pool of virtual tapes according to the request, wherein the defined storage quota limits a quantity of data that the user entity can store in physical storage of the storage system; receiving a second request from the user entity to write data to the virtual tape of the pool of virtual tapes; and returning a first status that indicates the data to be written from the second request cannot be written and failing the second request where a quantity of the data from the user entity's second request exceeds the defined storage quota.

25 Claims, 8 Drawing Sheets

US 9,063,842 B1

TECHNIQUE FOR INTEGRATING VTL TAPE POOLS WITH MTREE QUOTAS

BACKGROUND

1. Field

The present disclosure relates to virtual tape libraries and in particular to managing the capacity of the underlying physical storage.

2. Background Information

One way that has been historically used to store data is with the use of a physical tape library. A physical tape library represents a collection of physical tapes (e.g., physical magnetic tapes). Often a physical tape library may include a large number, for example thousands to hundreds of thousands, of such physical tapes. A robotic arm known as a picker may be used to select the physical tapes from slots and insert them into physical tape drives under electronic control. The physical tape library may be coupled with a network and used for network data storage. Backup software applications or other software (e.g., on network coupled computers) may be configured to use such physical tape libraries.

A virtual tape library (VTL) provides an alternative to a physical tape library. A VTL appears to be a physical tape library to backup applications, or other software that utilize such a library—i.e., a VTL emulates a physical tape library. However, data for a VTL is not typically stored on physical magnetic tapes, but the VTL data is stored on one or more hard disk drive arrays, solid state storage devices, or other types of physical storage. This implementation offers an advantage over a physical tape library because that a VTL implementation does not typically rely on the mechanics (e.g., robotic arms) used for the physical tape library. Moreover, a backup application, or other software utilizing a VTL, does not need to know that physical magnetic tapes are not being used for data storage, and therefore no software changes are necessary. This advantage avoids modifying existing software applications (e.g., backup applications) and other implementation arrangements that are designed to use physical tape libraries. As a further advantage, the data stored by a backup application to a VTL may be stored as a file in a file system. As such, a VTL is generally able to take advantage of advanced file system functionalities, such as compression techniques for performing data deduplication, replication, redundancy, segmenting, and/or other file system based technologies.

As mentioned above, the virtual tape library should appear to be and/or should emulate a physical tape library so that the backup applications, or other software using the virtual tape library, do not need to know that they are not using a physical tape library. Accordingly, a VTL should generally be able to handle requests to read and write data to and from the underlying physical storage.

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following description, numerous specific details are set forth, such as specific data storage system and/or storage appliance configurations, virtual tape library descriptions, arrangements and contents of modules, caches, orders of operations in flowcharts, component partitioning/integration details, and the like. However, it is understood that embodiments of the invention may be practiced without these specific details. In other instances, well-known circuits, structures and techniques have not been shown in detail in order not to obscure the understanding of this description.

Figure 1:
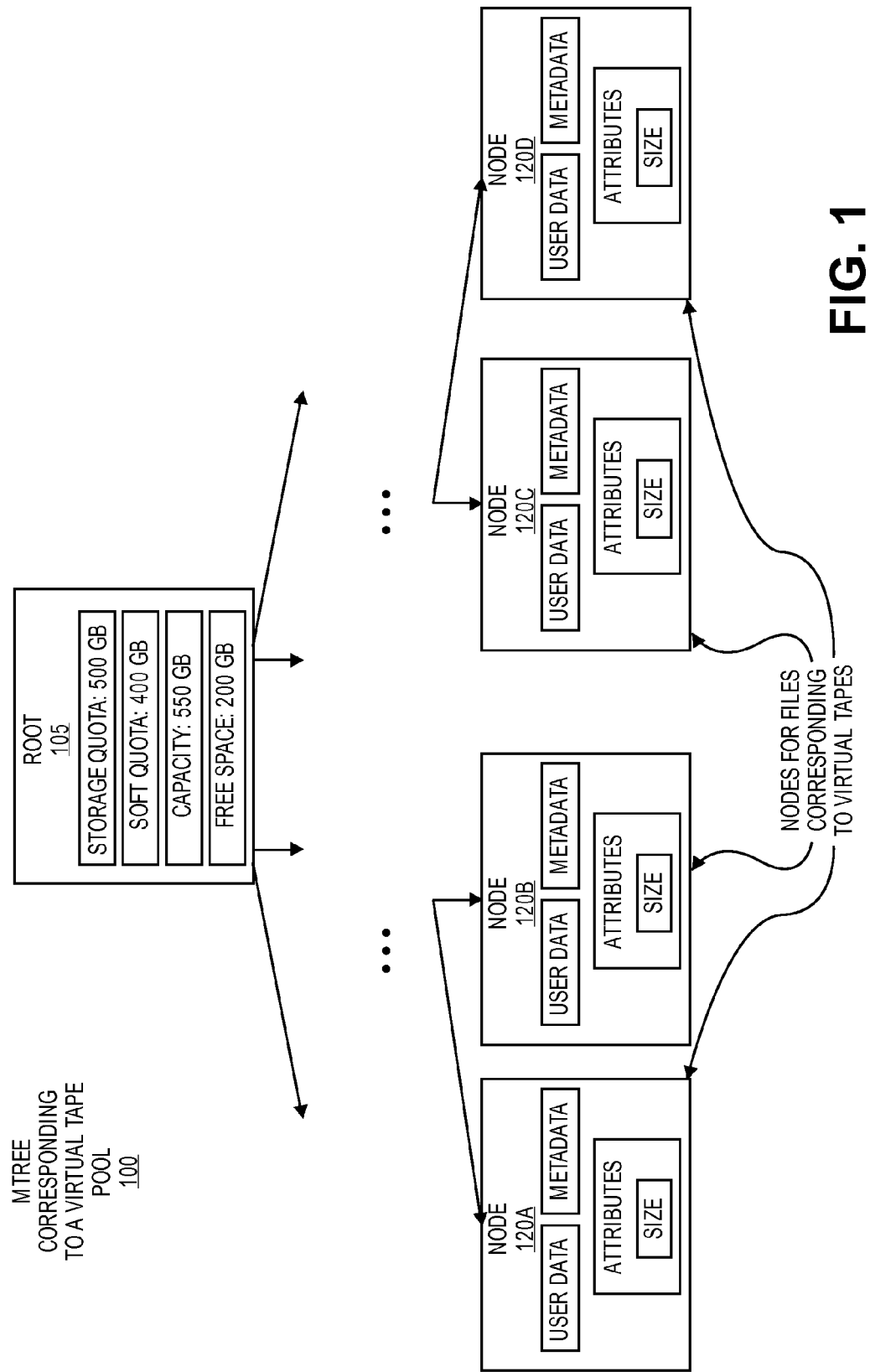
FIG. 1 is a block diagram of a file stored as a Managed Tree (MTree).

FIG. 1 is a block diagram illustrating one embodiment of a Managed Tree (MTree) 100 that corresponds to a pool of virtual tapes. The MTree 100 is a logical partition of a file system in a data storage system that enables management of data stored in the data storage system. A user entity (e.g., a company, a customer, an implementer of a backup application or other user) can be allocated a pool of virtual tapes (by creation or otherwise) in a data storage system. The pool of virtual tapes corresponds to, or is associated with, the MTree 100, which is hosted in the data storage system. The MTree 100 is a data structure that represents, for example, a file system, such as a file system for a pool of virtual tapes. As such, the MTree 100 has properties (e.g., a name or other identifier) and is amenable to data storage techniques (e.g., replication, compression and the like) to facilitate correspondence with the pool of virtual tapes and to efficiently store data in the data storage system.

In one embodiment, the MTree 100 includes a root node 105 in which some properties of the MTree 100 can be stored. In the embodiment illustrated in FIG. 1, the root node 105 includes properties such as a capacity allocated to the MTree 100 (e.g., a quantity of storage that the files stored in the MTree can consume in the aggregate), as well as dynamically adjusting properties such as the currently available free space for the MTree 100.

As a property of its implementation, the MTree 100 includes one or more quotas, such as an upper bound on a quantity of data that a user entity can store in the MTree 100. These quotas can be stored as properties of the MTree 100 in the root node 105 or any other node, such as an internal node (not shown). In the illustrated embodiment, the MTree 100 includes two quotas: a storage quota and a soft quota. One or both of these quotas can be defined at the design time or at any point thereafter and by any entity, depending upon the embodiment. For example, an administrative entity having control over a data storage system hosting the MTree 100 can define the storage quota, while a user entity accessing the MTree 100 for data storage can define the soft quota (although the administrative entity can define both quotas).

A storage quota is a hard limit on a quantity of data that a user entity can store in the MTree 100—that is, the user entity cannot exceed the storage quota. Once a quantity of data stored for the user entity in the MTree 100 has reached the storage quota, the user entity is no longer able to write data that is to be stored in the MTree 100—e.g., write requests that the user entity attempts to append to files in the MTree 100 will fail. This storage quota can be defined (e.g., by an administrative entity or user entity) or can be a property of the data storage system (e.g., a physical or logical capacity of a storage device).

In one embodiment, the storage quota of the MTree 100 is logically defined—that is, the storage quota is based on the logical bytes stored for the user entity, rather than the physical bytes. For example, the user entity may have three hundred (300) gigabytes (GB) of data stored across files in the MTree 100, but a compression scheme (e.g., data deduplication) stores the user entity's 300 GB as 100 GB in the data storage system hosting the MTree 100. In such an example, the 300 GB is used to compare data stored for the user entity to the storage quota. In another embodiment, the storage quota is defined in physical bytes stored for the user entity.

Unlike the storage quota, a soft quota of the MTree 100 is not used to enforce storage limits on the underlying storage capacity. Rather, the soft quota is implemented to avoid reaching the storage quota (and consequently failing write requests from a user entity) so that the data storage system and/or a user entity interacting therewith may robustly manage instances wherein the free space of the user entity's MTree 100 is approaching zero. Similar to the storage quota, the soft quota of the MTree 100 can be a logical limit (e.g., a quantity of data that is less than the storage quota) and can be defined (e.g., by an administrative entity or user entity).

In many embodiments, one or both of the free space and the storage quota are used to provide an "early warning"—i.e., an indication that the free space of the MTree 100 is approaching zero—to the user entity storing data in the MTree 100. The data storage system may need to perform computations in order to determine if the user entity should be provided such an early warning. The data storage system may need to determine that the free space of the MTree 100 is within a predetermined threshold or if the storage quota is nearly reached (e.g., using the difference of a predetermined amount subtracted from the storage quota). Other computations may also be necessary, such as an anticipating an amount of metadata required to store subsequent write requests from the user entity and factoring that anticipation into the aforementioned comparison.

The properties stored in the root node 105 influence the data that is stored for a user entity in the MTree 100 and this user-entity data is stored in nodes 120A-D of the MTree 100. In some embodiments, a user entity sends a request to write data to the data storage system and the data from the write request is written to one or more files, which are stored as the nodes 120A-D of the MTree 100. Generally, the data storage system emulates a physical tape library by presenting the user entity with a virtual tape library (VTL) and, therefore, the user entity requests writes to a virtual tape of the virtual tape pool represented by the MTree 100. In the underlying storage and logic, each virtual tape presented to the user entity as a target for writes—e.g., a virtual tape cartridge loaded into a virtual tape drive—corresponds to a file (i.e., a virtual tape file) that is stored in the MTree 100 as a node 120A-D. In one embodiment, this correspondence is not necessarily one-to-one; that is, a file stored as a node 120A-D may correspond to multiple virtual tape cartridges or vice versa.

In one embodiment, a node 120A-D includes the data and metadata for a file stored for a user entity in the MTree 100. Typically consuming the largest quantity of storage space, user data is included in a node 120A-D. User data can be, for example, data accepted from a write request from the user entity and stored in the data storage system. Additionally, a node 120A-D can include some properties about data stored in the node 120A-D of the MTree 100. Often, the additional properties include some metadata associated with the user data, such as an identification of the user entity, compression data necessary to reassemble the file stored at the node 120A-D for the user entity (e.g., a segment tree) and similar metadata. A node 120A-D can further include attributes of the node 120A-D, such as a size (i.e., quantity) of data stored in the node 120A-D, an identification of the file stored in the node 120A-D, a time stamp, and similar attributes. In some embodiments, the metadata and attributes are commingled.

Figure 2:
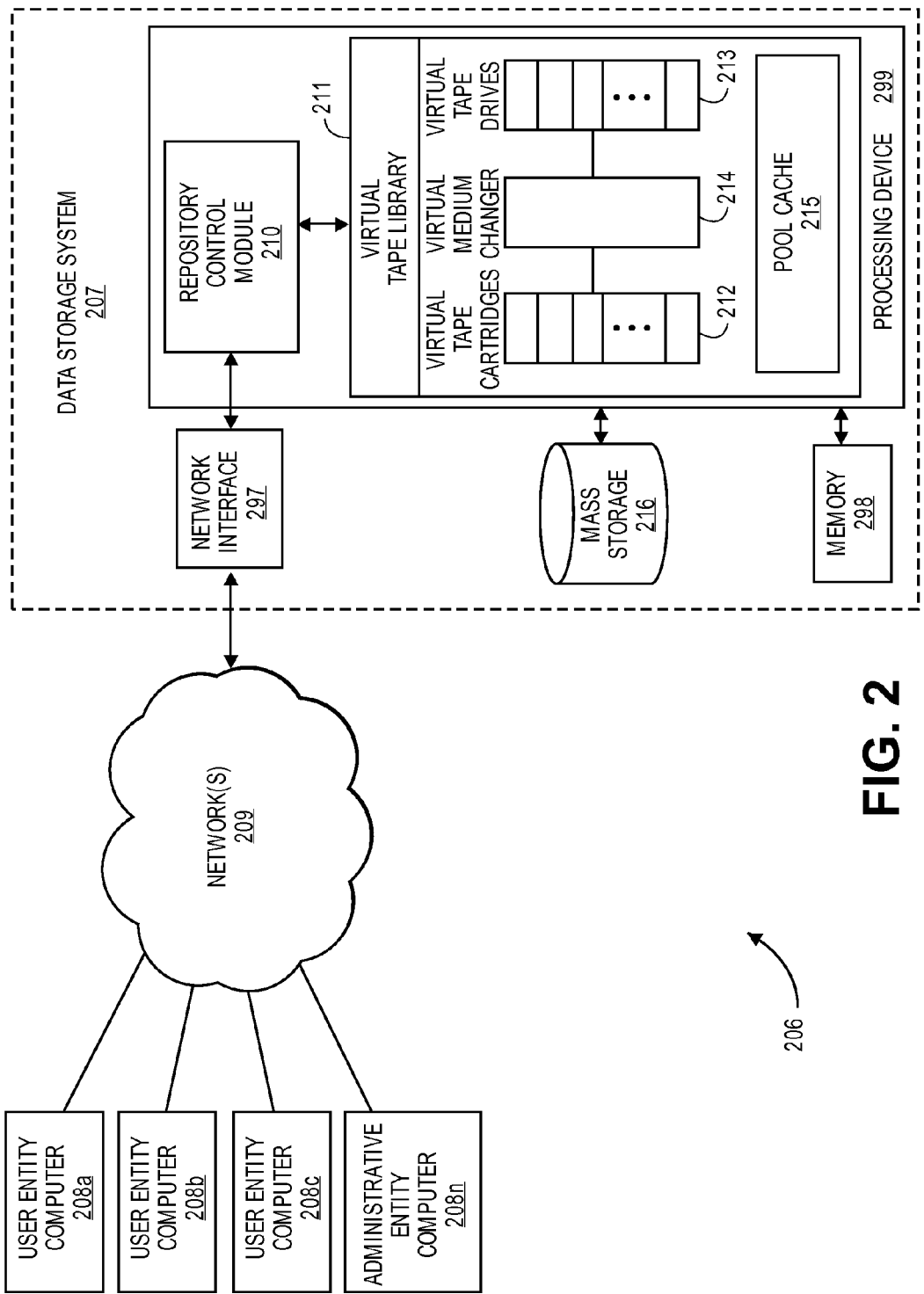
FIG. 2 is a block diagram of a network storage system including an embodiment of a data storage system having a virtual tape library.

Turning to FIG. 2, a block diagram illustrates a network storage system 206 including an embodiment of a data storage system 207 to backup or otherwise store data for a plurality of entities operating computers 208*a-n*. While in the illustration only four computers are shown, it is to be appreciated that there may be potentially a large number of such computers. Each of the computers 208*a-n* may represent a desktop, workstation, server, portable, laptop, or other type of computer. Further, each of the computers 208*a-c* can be for a different user entity or all of the computers 208*a-c* can be for the same user entity. In one embodiment, at least one computer 208*n* is for an administrative entity that has control over the data storage system 207 and can influence storage capabilities (e.g., by defining a storage quota) for a user entity at another computer 208*a-c*.

The computers 208*a-n* are communicatively coupled with the data storage system 207 via the network(s) 209. The one or more intervening networks 209 may represent one or more public, private, wired, wireless, hybrid, or other types of networks, or a combination of different types of networks. The network 209 can be implemented as a local area network (LAN), a wide area network (WAN) such as the Internet, a corporate intranet, a metropolitan area network (MAN), a storage area network (SAN), a Fibre Channel (FC) network, a bus, or a combination thereof. The scope of the invention is not limited to any known type of network.

To transmit data between the computers 208*a-n* over the network 209, the data storage system 207 includes a network interface 297. The network interface 297 can accept data across the network 209 from a computer 208*a-n* to be processed or stored in the data storage server 207. The network interface 297 can be implemented in hardware, software or a combination of the two and can include, for example, components such as a network card, network access controller or a host bus adapter. The network interface 297 is communicatively coupled with a processing device 299, which executes instructions and processes data to be stored in the data storage server 207. In one embodiment, some or all of the instructions for the network interface 297 are executed by the processing device 299.

The processing device 299 is configured to execute instructions for performing operations across a number of components within the data storage system 207 and can include, for example, a general-purpose processor, a central processing unit, or a plurality of processors suitable for implementation within a data storage server. The processing device 299 is communicatively coupled with a plurality of components within the data storage server 207. Accordingly, the processing device 299 executes instructions that cause data to be stored in the mass storage 216 according to write requests from a computer 208a-c received over the network 209.

To accept read and write requests from a computer 208a-c, the network interface 297 of the data storage system 207 is communicatively coupled with a repository control module 210. The repository control module 210 may be implemented in software, firmware, hardware, or a combination thereof. In the data storage system 207, a request from a computer 208a-c passes from the repository control module 210 to a virtual tape library 211, which emulates a physical tape library for a computer 208a-c. The virtual tape library (VTL) 211 includes a plurality of virtual tape cartridges 212, a plurality of virtual tape drives 213 to interface with the virtual tape cartridges, and a virtual medium changer 214 to virtually place virtual tape cartridges 212 in the virtual tape drives 213. The repository control module 210 may control or manage various different operational aspects of the data storage system 207 in generally conventional ways, particularly with respect to emulating the VTL 211 for a computer 208a-c (although this can be done in tandem with the network interface 297). In one embodiment, the repository control module 210 may control or manage storage of data in the virtual tape library 211, access to data in the virtual tape library 211, and the like.

To mitigate potentially time-consuming or otherwise costly interactions to components outside the VTL 211, the VTL 211 includes a pool cache 215. The pool cache 215 stores frequently accessed information about pools of virtual tape cartridges 212 (and therefore about MTrees). Thus, requests (e.g., Remote Procedure Call requests) to be sent outside the VTL 211 are reduced. The pool cache 215 can include information related to an MTree corresponding to a pool of the virtual tape cartridges 212, such as free space, capacity, storage quota and soft quota. In one embodiment, the pool cache 215 includes entries for multiple MTrees—e.g., multiple user entities at computers 208a-c can interact with the VTL 211 and each user entity at a computer 208a-c will have at least one individual entry in the pool cache 215 for its individual MTree corresponding to the file(s) stored for that user entity.

Communicatively coupled with the processing device 299 is a memory 298. The memory 298 can be volatile, such as static random access memory (SRAM) and/or dynamic random access memory (DRAM). The memory 298 provides storage of computer readable instructions, data structures, modules, and other data for the data storage system 207. In one embodiment, data associated with implementing the VTL 211 is executed from the memory 298 by the processing device 299. Other applications (not shown) can be loaded into the memory 298 to be executed by the processing device 299. The memory 298 can also include cache memory, such as a cache located at the processing device 299. In some embodiments, the memory 298 can be distributed into several components of the data storage system 207, including the processing device 299 and the network interface 297.

Applications (not shown), such as backup applications, archive applications, or other software, on a computer 208a-c can backup or otherwise store data on the data storage system 207. The applications may determine when to store data and can transmit requests to write data over the network 209 to the data storage system 207. The applications can also issue commands to access data (e.g., read) that is stored in the data storage system 207. In one embodiment, the applications transmit Small Computer System Interface (SCSI) requests to write data to and read data from the virtual tape cartridges 212. In one embodiment, at least one computer 208a-c is for a user entity that stores data at the data storage system 207 and at least another computer 208n is for an administrative entity that has control over the data storage system 207 and can define quotas for the user entity.

The data storage system 207 also includes mass storage 216. Data received from a computer 208a-c at the VTL 211 is ultimately stored in the mass storage 216. Often, data received at the VTL 211 undergoes additional processing before the data is stored in the mass storage 216—e.g., a file system (not shown) can perform deduplication, redundancy, segmenting, and similar compression techniques. According to various embodiments, the mass storage 216 can include, but is not limited to, one or more hard disk arrays, sets of magnetic disks, solid-state storage devices, physical tapes, other mass storage devices known in the arts, and combinations of such different types of mass storage. Further, the mass storage 216 can be implemented in the same computing apparatus as the VTL 211 or can be remotely located (e.g., as in a distributed computing environment), depending on the particular implementation.

Figure 3:
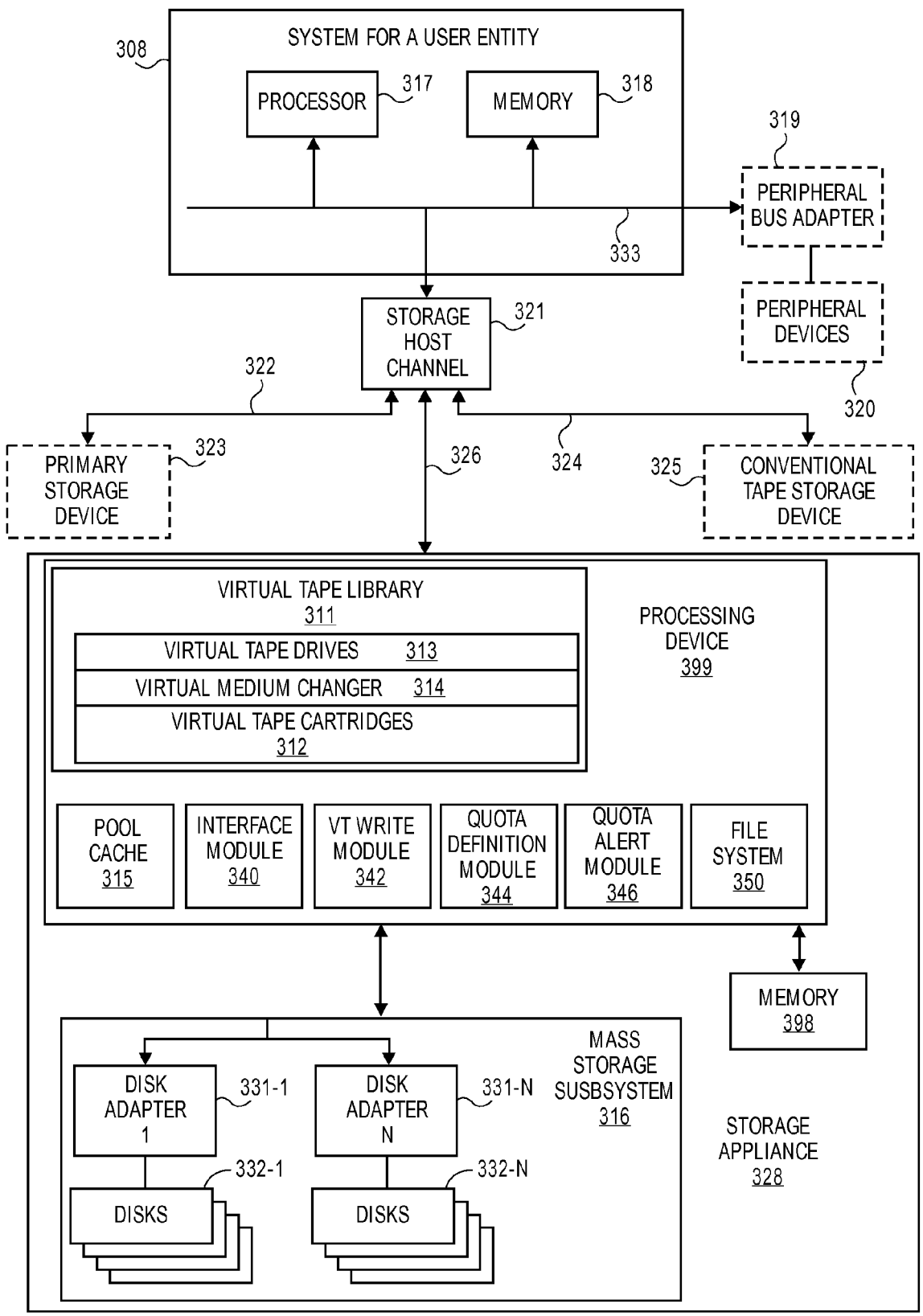
FIG. 3 is a block diagram of a data processing system coupled to an embodiment of a storage appliance having a virtual tape library.

Now with reference to FIG. 3, a block diagram illustrates a system for a user entity 308 coupled to a storage appliance 328. The system for a user entity 308 can be a desktop, workstation, server, laptop, or other computer, or other type of data processing system (e.g., a user entity computer 208a-c). The system for a user entity 308 has a processor 317 (e.g., a central processing unit or general processing unit) coupled to a memory 318 (e.g., SRAM or DRAM) by circuitry including a bus 333. A peripheral bus adapter or hub 319 coupled to the bus 333 provides a communications path for peripheral devices 320, such as printers, local terminals, local and wide area networks, displays, graphics, additional memory or storage and the like.

A storage host controller or channel 321 coupled to the bus 333 provides communications paths to a variety of different storage media. This storage host channel 321 can communicate through a network adapter and/or directly through peripheral device busses (e.g., a host bus adapter). A first channel 322 provides a communications path between the storage host channel 321 and a primary storage device 323 (e.g., a magnetic disk storage unit or hard disk drive). The primary storage device can store an operating system, applications, software programs, local data, or the like (not illustrated). A second channel 324 may provide a communications path between the storage host channel and a conventional physical magnetic tape storage device 325. A third channel 326 may provide a communications path between the storage host channel and the storage appliance 328.

The storage appliance 328 includes a VTL 311 coupled with a mass storage subsystem 316. A host or channel adapter 327, for example within the virtual tape library, is coupled with the storage host channel 321. The VTL 311 also includes virtual tape drives 313, a virtual medium changer 314, and virtual tape cartridges 312. Additionally, the VTL 311 is communicatively coupled with a pool cache 315. In the illustrated embodiment, the pool cache 315 is shown as outside the VTL 311, although this is not required, and the pool cache 315 can be incorporated in the VTL 311 or further nested in the enumerated components 312-314 of the VTL 311 (e.g., the pool cache 315 can be implemented as part of the virtual tape cartridges 312).

Ultimately, data sent through the VTL 311 may be stored on the mass storage subsystem 316. This storage operation may occur after file system processes have been performed on the data (e.g., for deduplication, redundancy, redundant array of independent disks (RAID), etc.). In one embodiment, the storage appliance 328 is a deduplication backup appliance and performs deduplication on the data, although this is not required. The illustrated embodiment of the mass storage system 316 includes multiple disk adapters 331-1 through 331-N each having a corresponding array or set of magnetic or hard disks 332-1 through 332-N. Other embodiments may use other mass storage (e.g., a single set of hard disks, magnetic tape mass storage, semiconductor mass storage, other types of mass storage, combinations of different types of storage, etc.).

In one embodiment, the storage appliance 328 can include the data storage system 207 of FIG. 2. Accordingly, the VTL 311 can include the VTL 211, the virtual tape cartridges 312 can include the virtual tape cartridges 212, the virtual tape drives 313 can include the virtual tape drives 213, the virtual tape medium changer 314 can include the virtual tape medium changer 314, and the pool cache 315 can include the pool cache 215. Similarly, processing device 399 can include processing device 299, memory 398 can include memory 298, and mass storage subsystem 316 can include mass storage 216.

Still with reference to FIG. 3, the processing device 399 is configured to execute a number of modules and applications at the storage appliance 328. In the illustrated embodiment, the processing device 399 is configured to execute an interface module 340, a virtual tape write module 342, a quota definition module 344, and a quota alert module 346. In one embodiment, the modules 340-346 are software having instructions stored (at least temporarily) in memory 398. However, one or more modules 340-346 can be implemented in hardware (e.g., as an application-specific integrated chip) or a combination of hardware and software. The processing device 399 is further configured to execute instructions for a file system 350.

The interface module 340 is configured to receive requests originating at the user entity system 308—i.e., requests to interact with the VTL 311, such as a request to write data to a virtual tape cartridge 312 loaded into a virtual tape drive 313 by the virtual tape medium changer 314. The interface module 340 can be configured to receive these requests as, for example, SCSI requests (e.g., SCSI read and/or write requests). Accordingly, the interface module 340 can further be configured to return responses to the user entity system 308, such as a response to a SCSI read request or a SCSI status code.

The user entity system 308 can be remotely located from the storage appliance 328 and, therefore, the interface module 340 is configured to interact with intermediary hardware and/or software requisite for remote system interaction. In one embodiment, the interface module 340 is configured to communicate with a physical host bus adapter, such as a host bus adapter configured to receive SCSI requests over a Fibre Channel network. Furthermore, the interface module 340 can be configured to interact with one or more kernel layers, such as a SCSI kernel configured to provide a bridge between the SCSI hardware and software.

The virtual tape write module 342 is configured to write requests received by the interface module 340. Because the VTL 311 is configured to emulate a physical tape library for the user entity system 308, the virtual tape write module 342 is configured to provide a bridge between the VTL 311 and the underlying mass storage subsystem 316. In one embodiment, the virtual tape write module 342 is configured to process a request originating at the user entity system 308 for a virtual tape cartridge 312 loaded into a virtual tape drive 313 by providing a bridge to the underlying mass storage device 316. The virtual tape write module 342 can receive a write request through the interface module 340 that is addressed to one virtual tape cartridge 312 in one virtual tape drive 313 and subsequently cause the data from the write request to be written to a corresponding file stored on a disk 332 in the mass storage subsystem 316.

In some embodiments, the virtual tape write module 342 is configured to process a SCSI request received through the interface module 340. The SCSI request can include a target address that identifies the virtual tape cartridge 312 and/or virtual tape drive 313 to which the SCSI request is addressed—e.g., a SCSI request can include a logical block address (LBA) in its command descriptor block (CDB) and/or a frame(s) (e.g., a Fibre Channel frame) in which the SCSI request is packaged can include a logical unit number (LUN). With addressing information included in a SCSI request, the virtual tape write module 342 can identify a file stored on a disk 332 in the mass storage subsystem 316 that corresponds to the virtual tape cartridge 312 loaded into the virtual tape drive 313 to which the SCSI request is addressed. Accordingly, the virtual tape write module 342 interacts with a disk adapter 331 to cause data included in the payload of a SCSI write request to be written to a disk 332 (in the corresponding file).

Due to physically or logically imposed storage constraints (e.g., disk capacity or an administratively defined storage capacity), the virtual tape write module 342 is unable to write data to the mass storage subsystem 316 ad infinitum. To aid the storage appliance 328 in robustly handling write requests that exceed the capacity that the user entity system 308 is able to write, the storage appliance 328 includes a quota definition module 344 and a quota alert module 346.

The quota definition module 344 is configured to define a storage quota for a pool of virtual tape cartridges 312 allocated to a user entity of system 308 and stored as an MTree (not shown) for the user entity in the mass storage subsystem 316. The quota definition module 344 is configured to set one or both of the storage quota and the soft quota that limit data stored in the mass storage system 316 for a user entity. One or both of these quotas can be defined at the design time or at any point thereafter and by any entity, depending upon the embodiment. For example, an administrative entity having control over the storage appliance 328 of the user entity can define one or both of the storage quota and the soft quota.

In one embodiment, the user entity system 308 sends one or more commands according to the Transport Layer Security (TLS)/Secure Sockets Layer (SSL) or Secure Shell (SSH) protocol. The interface module 340 is configured to receive such a secure command and provide the command to the quota definition module 344. In response, the quota definition module 344 is configured to define the storage quota or the soft quota of an MTree stored in the mass storage subsystem 316 corresponding to a pool of virtual tape cartridges 312 allocated to the same or different user entity (e.g., an administrative entity can define the storage quota for a customer user entity, while that customer user entity may define its own soft quota).

Complementary to the quota definition module 344, the quota alert module 346 is configured to enforce the one or more quotas defined through the quota definition module 344. Thus, the quota alert module 346 is configured to provide a status to the user entity system 308 that indicates a write request received by the interface module is unable to be written to the mass storage subsystem 316 (where the storage quota is exceeded) or a status that indicates the user entity is approaching the storage quota (e.g., a computed "early warning"). The quota alert module 346 is further configured to provide an alert indicating that the soft quota is exceeded. For example, an e-mail or other message can be provided to an administrative entity (not shown in FIG. 3; e.g., computer 208n of FIG. 2) that indicates the user entity is approaching the defined storage quota.

A user entity is unable to exceed that storage quota defined for that user entity and, therefore, any write requests issued by the user entity system 308 that cause the storage quota to be exceeded will fail—that is, data from a write request causing the storage quota to be exceeded is not written to the storage appliance 328 by the virtual tape write module 342. Thus, the ability of the virtual tape write module 342 to write data from the user entity system 308 to the mass storage subsystem 316 is contingent upon a determination by the quota alert module 346 that the data does not cause the user entity's storage quota to be exceeded. Where such data causes the storage quota to be exceeded, the quota alert module 346 fails the write request and provides a storage quota status to the user entity system 308 to indicate that the request failed. To avoid failing write requests from the user entity system 308, the quota alert module 346 issues an early warning where data stored for the user in the mass storage sub system 316 nears the storage quota.

In some embodiments, the quota alert module 346 indicates to the user entity system 308 that a write request from the system 308 has failed by providing a SCSI status code through the interface module 340. For example, in response to receiving a SCSI write request from the user entity system 308, the quota alert module 346 can cause a SCSI "Check Condition" status code to be provided to the user entity system 308. The user entity system 308 may send a SCSI Request Sense command in order to obtain a Key Code Qualifier (KCQ) from the storage appliance 328. The quota alert module 346 can provide a KCQ indicating that the write failed and/or that the last write request from the user entity system 308 causes the storage quota to be exceeded.

In many embodiments, quota alert module 346 is configured to perform computations in order to determine if the user entity system 308 should be provided an early warning status indicating that the free space allocated to the user entity in the storage appliance 328 is approaching zero, and therefore is approaching the storage quota.

In one embodiment, the early warning is provided to the user entity system 308 as a SCSI status code. For example, in response to receiving a SCSI write request from the user entity system 308, the quota alert module 346 can cause a SCSI "Check Condition" status code to be provided to the user entity system 308 through the interface module 340. The user entity system 308 may send a SCSI Request Sense command in order to obtain a KCQ from the storage appliance 328. The quota alert module 346 can return a KCQ indicating that the user entity is approaching the storage quota. The user entity may take appropriate action in response to receiving such a SCSI status code—e.g., the user entity can issue a command from the system 308 that is to close a virtual tape cartridge 312 loaded into a virtual tape drive 313 and/or the user entity may contact an administrative entity of the storage appliance 328 to purchase or otherwise obtain additional storage space.

To improve storage efficiency and otherwise facilitate writes intended for the mass storage subsystem 316 from the virtual tape write module 342, the storage appliance 328 includes the file system 350. The file system 350 is configured to service requests (e.g., write requests) provided by the virtual tape write module 342 at the underlying storage level (i.e., at the level of the mass storage subsystem 316). For example, the file system 350 can be configured to organize files stored in a disk 332-1 that correspond to virtual tape cartridges 312 for the user entity at the system 308. The file system 350 can read and write data received through the VTL 311 from and to the mass storage system 316 and can be configured to manipulate the data such as by compressing it (e.g., deduplication), replicating it, snapshotting it, or reassembling it (e.g., from stored segments comprising a file corresponding to a virtual tape cartridge 312).

Figure 4:
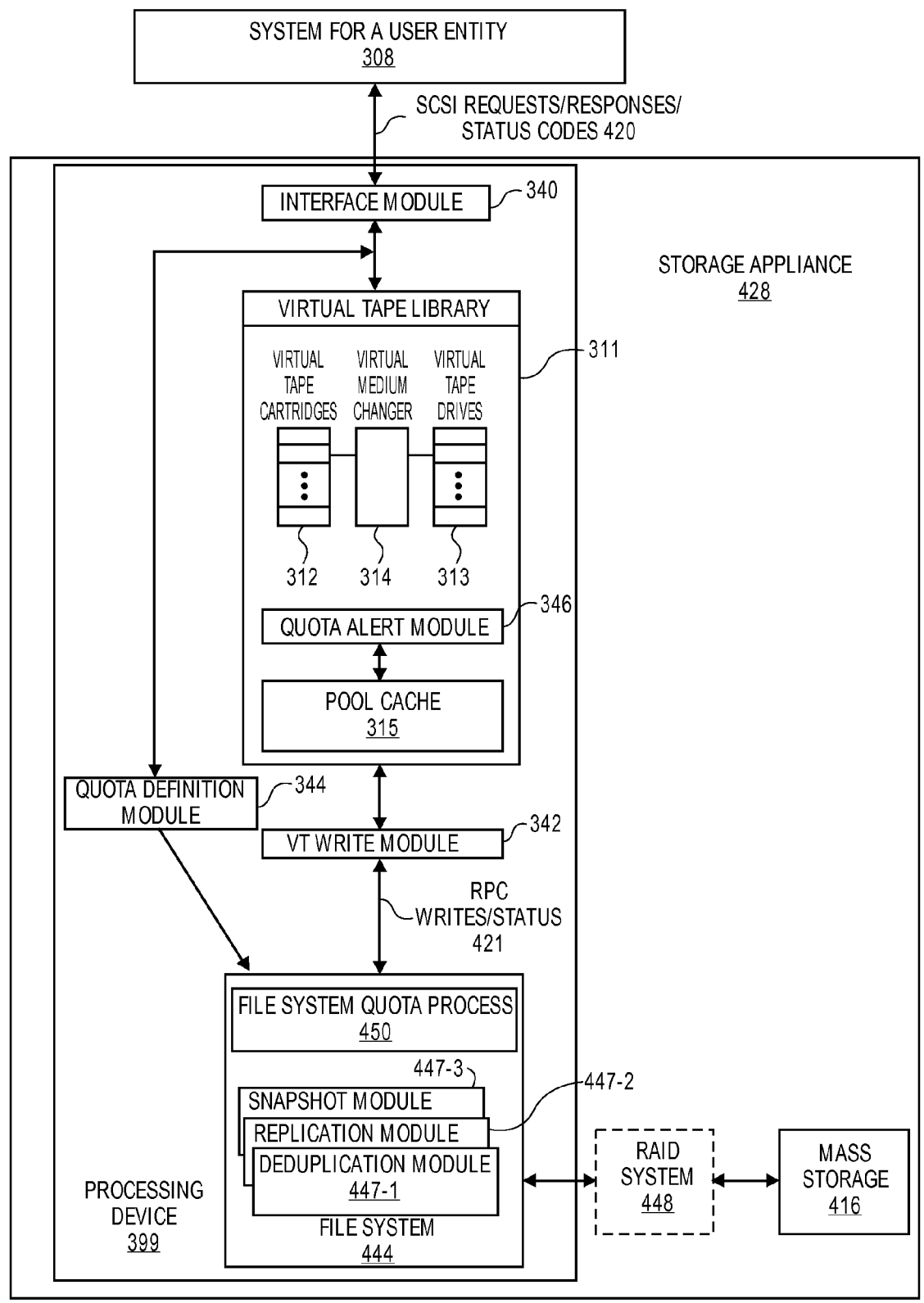
FIG. 4 is a block diagram of an embodiment of a storage appliance in which a file system is logically disposed between a virtual tape library and mass storage.

Turning now to FIG. 4, a block diagram is illustrates a storage appliance 428 that includes a file system 444 logically disposed between a virtual tape library 411 and mass storage 416 used to store data written to the virtual tape library 311. FIG. 4 illustrates an embodiment that is complementary to FIG. 3 and therefore includes several of the components described with respect to that figure. FIG. 4 further illustrates an embodiment of the communication paths that requests, responses, and the like travel between the user entity system 308 and the storage appliance 428, which can include the storage appliance 328 of FIG. 3. Accordingly, file system 444 can include file system 350 and mass storage 416 can include mass storage subsystem 316.

In the embodiment illustrated in FIG. 4, the user entity system 308 sends requests to and receives responses 420 from the storage appliance 428—e.g., the user entity can backup and/or recover data using SCSI requests to interact with the VTL 311, which emulates a physical tape library. Data from the virtual tape library is stored as files (e.g., virtual tape files) through the file system 444. In various embodiments, the file system 444 supports any one or more of various different types of file processing operations associated with network data storage. For example, the file system may include a deduplication module 447-1 to perform deduplication, a replication module 447-2 to perform replication, and a snapshot module 447-3 to perform a snapshot. In some embodiments, data from the file system 444 is provided to a redundant array of independent disks (RAID) system 448. Data from the RAID system 448 and/or from the file system 444 can be stored on mass storage 416.

The user entity system 308 can send requests to the storage appliance according to a variety of protocols, e.g., the SCSI protocol and the TLS/SSL or SSH protocol. In one embodiment, the interface module 340 is agnostic to the type of request, but is configured to distribute the request appropriately within the storage appliance 428. In the illustrated embodiment, the interface module 340 is configured to differentiate between at least two types of requests: requests to define a storage quota or a soft quota for a user entity, which can be received according to a TLS/SSL or SSH protocol, and requests to write data to the storage appliance, which can be received as SCSI requests addressed to target virtual tape cartridges 312 that are loaded into target virtual tape drives 313.

To differentiate between request types, and therefore appropriately distribute requests within the storage appliance 428, the interface module 340 can parse a request and/or recognize the reception path of a request (e.g., requests received through a SCSI kernel are requests for the VTL 311). Requests that are to define one or both of the storage quota and the soft quota for a user entity are provided to the quota definition module 344 by the interface module 340. The quota definition module 344 can subsequently define the storage quota and/or the soft quota according to the request by, for example, storing the quota(s) in an MTree corresponding to a pool of virtual tape cartridges 312 allocated to the user entity of system 308.

Requests to write data to the storage appliance 428 (e.g., a SCSI write request to backup a large quantity of data) are directed from the interface module 340 to the VTL 311. In one embodiment, the interface module 340 provides the VTL 311 with a SCSI write request, originating from the user entity system 308, that is addressed to a target virtual tape cartridge 312 loaded into a target virtual tape drive 313. The VTL 311, emulating a physical tape library, can provide this request to the virtual tape write module 342, which can use the target addressing information included in the write request to identify an MTree and/or file corresponding to the target virtual tape cartridge 312 loaded into a target virtual tape drive 313. Accordingly, the virtual tape write module 342 can write the data included in the payload of the SCSI request to the identified file of the identified MTree.

Before the payload data of a SCSI write request is written by the virtual tape write module 342, the payload data is evaluated with respect to the soft quota and/or storage quota. In the illustrated embodiment, a quantity of the payload data is evaluated at the quota alert module 346 to determine if one or both of the soft quota and the storage quota are exceeded by the quantity of payload data. To compute this determination, the quota alert module 346 accesses a pool cache 315 to retrieve the storage quota and/or soft quota for the user entity. The quota alert module 346 populates the pool cache 315 by issuing a request to and receiving a response from—e.g., a Remote Procedure Call (RPC) request and response—a file system quota process 450 of the file system 444, which returns at least the storage quota and the soft quota (and potentially the free space, capacity, etc.). The quota alert module 346 accesses the pool cache 315 to minimize requests to the file system quota process 450, because such requests are computationally and temporally expensive (more so than accessing the pool cache 315). The quota alert module 346 can fail a write request, where the storage quota is exceeded, or provide the write request to the virtual tape write module 342 and additionally return an early warning to the user entity system 308 indicating that the user entity is approaching its defined storage quota. The quota alert module 346 can further provide an alert indicating that the soft quota is exceeded. For example, an e-mail or other message can be provided to an administrative entity (not shown in FIG. 3; e.g., computer 208n of FIG. 2) that indicates the user entity is approaching the defined storage quota.

Figure 5:
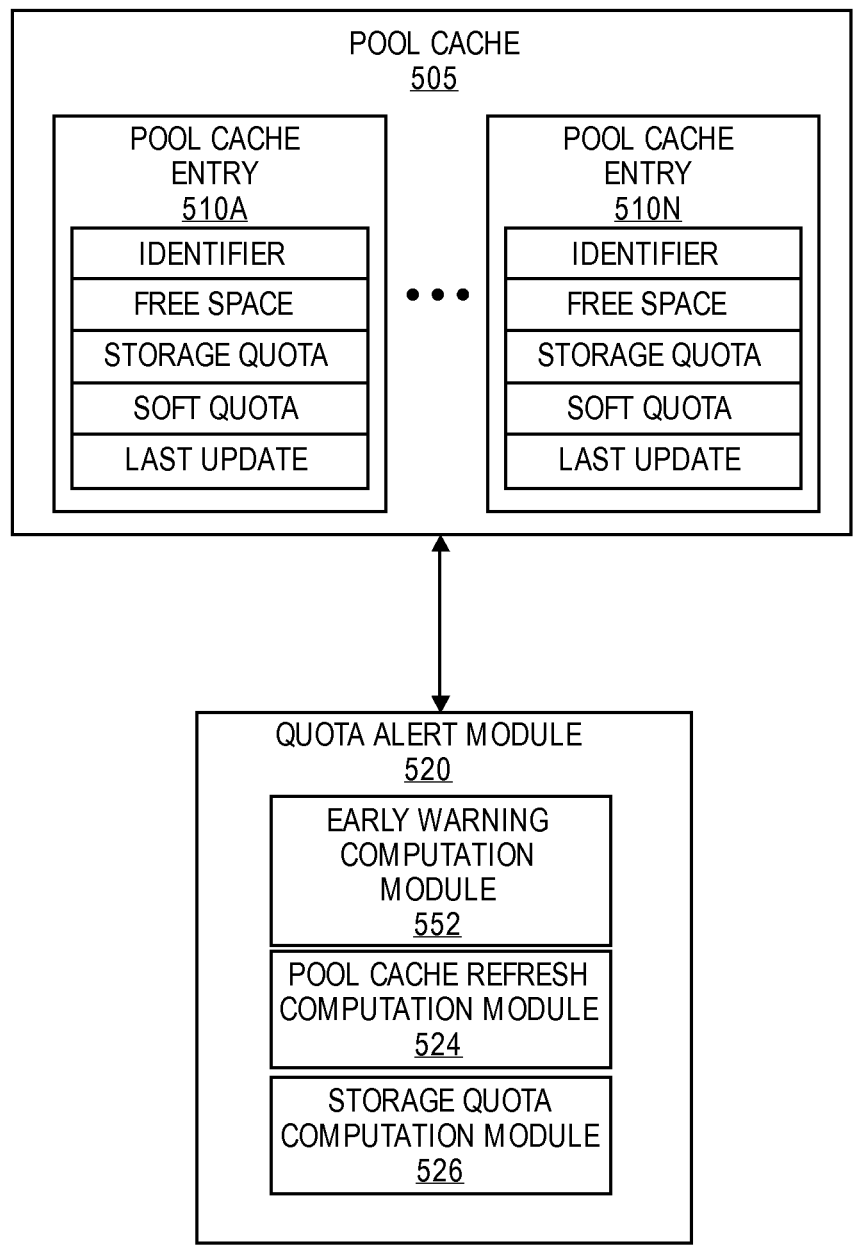
FIG. 5 is a block diagram of an embodiment of a pool cache and a quota alert module in a virtual tape library.

FIG. 5 is a block diagram of an embodiment of a pool cache 505 communicatively coupled with a quota alert module 520 in a data storage system. The pool cache 505 and the quota alert module 520 can be embodiments of the pool cache 315 and the quota alert module 346 of FIG. 3. However, in some embodiments, the pool cache 505 is logically implemented within a virtual tape cartridge layer of the data storage system (e.g., the virtual tape cartridges 312 of the VTL 311). The pool cache 505 can be implemented in a non-volatile and/or a volatile memory. In one embodiment, the pool cache 505 is implemented in volatile memory (e.g., DRAM or other random access memory) of a storage appliance that is separate from mass storage used to store the user data or records for the virtual tape library, and optionally a backup of the pool cache 505 is stored in a non-volatile memory.

In the illustrated embodiment, the pool cache 505 includes a plurality of cache entries 510A-N. Each entry 510A-N corresponds to a pool of virtual tapes, and therefore corresponds to an MTree, in the data storage system for a user entity. Generally, the data storage system provides services for a plurality of user entities and/or a plurality of MTrees for one user entity (e.g., where a user entity wishes to separate two or more sets of data). Accordingly, each user entity has one cache entry 510A-N in the pool cache 505 corresponding to each MTree for that user entity. Entries 510A-N in the pool cache 505 can be contingent upon the interaction of a user entity with the data storage system—e.g., where the user entity opens an access channel with the data storage system, loads a virtual tape cartridge into a virtual tape drive, or otherwise interacts with a virtual tape library of the data storage system, the pool cache 505 can be populated, invalidated, or refreshed.

An entry 510A-N in the pool cache 505 includes data (and metadata) about an MTree associated with a pool of virtual tapes for a user entity. To identify the entry 510A-N that corresponds to a specific MTree, an entry 510A-N can include an identifier, which can be any suitable identification means (e.g., an alphanumeric string). In connection with the identifier, a cache entry 510A-N can include the storage quota, soft quota, and free space available for the MTree corresponding to the entry 510A-N. In this way, when there is a "hit" in the pool cache 505, the same quota or free space information is retrieved from the pool cache 505 as would be retrieved if instead the corresponding MTree in the data storage system were accessed (e.g., by sending an RPC request to a file system quota process of a file system).

The quota alert module 520 is configured to access the pool cache 505 so that requests to a file system process of the data storage system can be reduced. Further, the quota alert module 520 can include logic influencing the population or refresh rate of the pool cache 505. To that end, the quota alert module 520 includes three modules: an early warning computation module 522, a pool cache refresh computation module 524 and a storage quota computation module 526.

In response to receiving a request to write data to the data storage system, the early warning computation module 522 is configured to compute whether the user entity should be provided an early warning that indicates the user entity is approaching its storage quota. In a simple embodiment, the early warning computation module 522 compares the free space computed from the MTree corresponding to the virtual tape to which the request is addressed to a threshold value. The computed free space can take into account the change in free space that occurs when data from a user entity's request is written to the data storage system, and causes the threshold to be exceeded. Consequently, the user entity may be provided an early warning indicating that the user entity is approaching the storage quota for the MTree (assuming the storage quota is not exceeded by the user entity's request). This early warning can be provided in the form of a "Check Condition" SCSI status code and a KCQ indicating that the user entity is approaching its storage quota. Other computations may also be necessary, such as anticipating an amount of metadata required to store subsequent write requests from the user entity and factoring that anticipation into the aforementioned comparison.

Also in response to receiving a request to write data to the data storage system, the storage quota computation module 526 is configured to fail the write request where the quantity of data from the request would cause the amount of data stored for the user entity to exceed the storage quota. In a simple embodiment, the storage computation module 526 fails the write request where the quantity of data from the user entity's write request causes the free space to fall below zero. Additionally, the user entity is provided a status to indicate that the write request failed to be completed. This status can be provided in the form of a "Check Condition" SCSI status code and a KCQ indicating that the write failed because the user entity has reached its storage quota.

The pool cache refresh computation module 524 is configured to refresh the pool cache 505 at a dynamic rate so that a pool cache entry 510A-N is more frequently refreshed as the amount of free space in an MTree for a user entity decreases. In one embodiment, this dynamic rate causes a pool cache entry 510A-N to be refreshed after each write request is accepted from the user entity. In another embodiment, the refresh computation module 524 is configured to dynamically adjust the rate at which a pool cache entry 510A-N is refreshed based on a timeout. The timeout can be dynamically changed based on the free space of the pool cache entry 510A-N—e.g., a pool cache entry 510A can be refreshed every sixty (60) seconds when the free space is greater than 250 GB, every ten (10) seconds when the free space is greater than 120 GB (but less than 250 GB), and every five (5) seconds when the free space is greater than twenty (20) GB (but less than 120 GB).

Figure 6A:
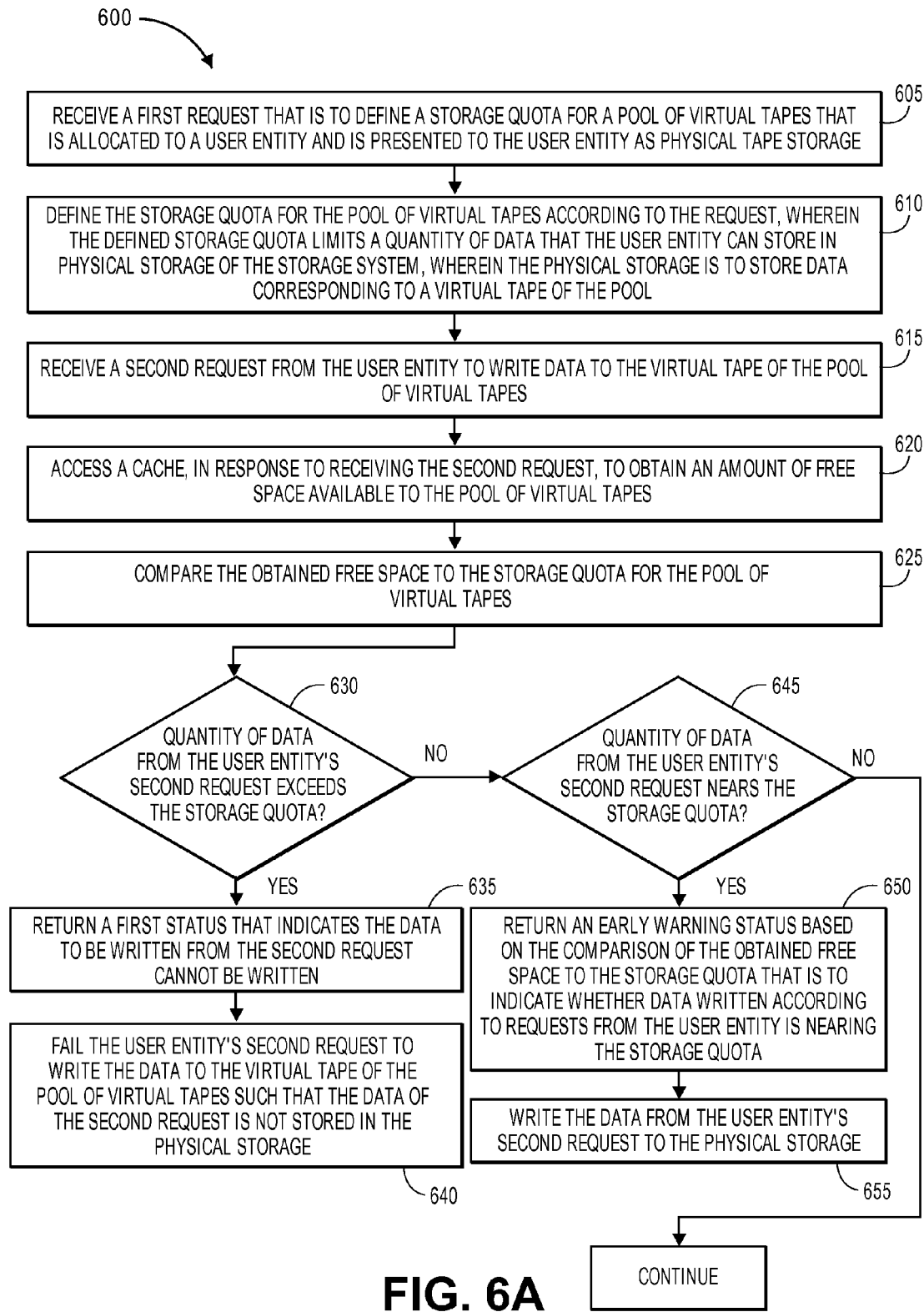
FIG. 6A is a flow diagram illustrating an embodiment of a method for providing statuses based on quotas in a system implementing a virtual tape library.

With reference to FIG. 6A, a flow diagram illustrates a method 600 for enforcing quotas with VTL tape pools in a data storage system. The method 600 can be performed by the data storage system 207 of FIG. 2 and/or the storage appliance 328 of FIG. 3. The operations of FIG. 6A are illustrative and are not necessarily performed in the order depicted. Further, it is not necessary for all operations to be performed—some operations are absent from some embodiments.

The illustrated method 600 presumes that the data storage system has stored therein a pool of virtual tapes for a user entity and that that pool of virtual tapes corresponds to an MTree stored in a storage device underlying a virtual tape library with which the user entity is to interact. Further, the method 600 presumes that in the data storage system a virtual tape cartridge is loaded into a virtual tape drive and that this arrangement is presented to the user entity as a target (e.g., a SCSI target) to which the user entity is to address requests. Accordingly, one of ordinary skill in the art will understand that a virtual tape can signify a virtual tape cartridge loaded into a virtual tape drive that is presented to the user entity as a target for requests and that a pool of virtual tapes can signify those virtual tape cartridges allocated to a user entity (and available to be loaded into a virtual tape drive).

Beginning first with operation 605, a first request is received at the data storage system performing the method 600. This first request is to define a storage quota for a pool of virtual tapes allocated to a user entity. The storage quota is a hard limit demarcating a maximum capacity of storage that the user entity is allowed to consume in the data storage system.

The first request can be received from the user entity to which the pool of virtual tapes is allocated or can be received from another entity, such as an administrative entity having permissions to define a storage quota for the user entity. In one embodiment, the first request is received according to a TSL/SSL protocol or SSH protocol. This first request can be received and routed at an interface layer(s) (e.g., a host bus adapter and/or a kernel) that recognizes the type of request and routes the first request to an appropriate module (e.g., an ASIC and/or software application) configured to process the first request.

At operation 610, a storage quota is defined in the data storage system according to the first request. The storage quota can be defined by storing the storage quota in an MTree for the user entity corresponding to a pool of virtual tapes allocated to the user entity. Once defined, the storage quota limits a quantity of data that the user entity can store in the storage device—i.e., physical storage—of the data storage system. Optionally, the storage quota can populate a pool cache by being assigned to an entry in the pool cache corresponding to the MTree for the user entity.

In some embodiments, operations 605 and 610 are absent. Rather, the storage quota is defined as a property of the data storage system. For example, the storage quota can be a physical capacity of the storage device underlying the VTL.

In another embodiment, the storage quota is a logical capacity of the underlying storage device that is defined at design time (e.g., hardcoded into the data storage system).

With the storage quota defined, the user entity can store data in the data storage system. Accordingly, at operation 615 a second request is received that is to write data to a virtual tape of the pool of virtual tapes allocated to the user entity. In one embodiment, this virtual tape is a virtual tape cartridge loaded into a virtual tape drive and is presented to the user entity as a target configured to accept requests (e.g., physical tape requests) from the user entity. Thus, the second request is typically addressed to the target virtual tape. For example, the second request can include LBA and/or LUN information in one or both of a SCSI request (e.g., in the CDB) and a frame (e.g., a Fibre Channel frame) in which the SCSI write request is packaged.

In some embodiments, the second request is a SCSI write request that includes a payload. The payload of the SCSI write request includes data that the user entity wishes to store in the data storage system (e.g., data that is to be backed up according to a backup application at the user entity's system).

Before accepting the second request, the data storage system determines if it is able to accept all or part of the data from the second request. To do so, a cache is accessed at operation 620, in response to receiving the second request, to obtain the amount of free space available to the pool of virtual tapes allocated to the user entity. The cache contains at least one entry for the MTree corresponding to the pool of virtual tapes allocated to the user entity. In one embodiment, the at least one entry additionally contains the storage quota and the soft quota for the MTree, and therefore the storage quota and the soft quota can also be obtained by accessing the cache.

Figure 7:
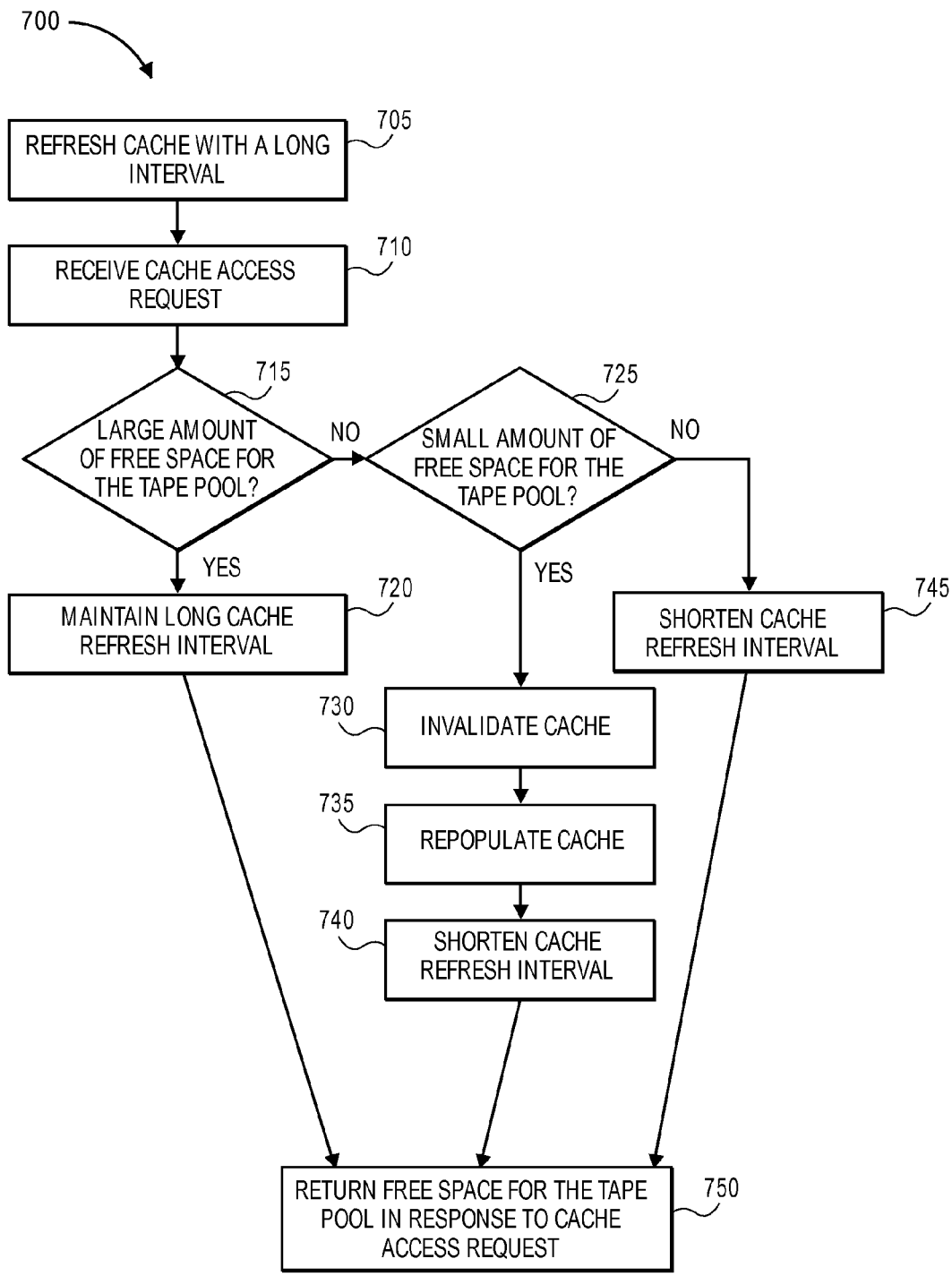
FIG. 7 is a flow diagram illustrating an embodiment of a method for refreshing a pool cache used to provide quota alerts in a system implementing a virtual tape library.

In one embodiment, accessing the cache to obtain the free space according to the MTree of the user entity causes the cache entry corresponding to the MTree to be refreshed at a different rate and/or invalidated. To prevent the user entity from reaching the storage quota for the MTree, the cache can be refreshed at a dynamic rate that is commensurate with the amount of free space. Accordingly, the cache can be more frequently refreshed as the obtained free space diminishes. An embodiment of this refresh process is illustrated in FIG. 7.

Still with respect to FIG. 6A, the obtained free space is compared to the storage quota at operation 625. In some embodiments, this operation 625 requires one or more computations. In a simple embodiment, the quantity of data from the second request is subtracted from the obtained free space and if the difference is less than zero then the data from the second request inherently exceeds the storage quota. However, if the difference is greater than zero but less than a predetermined threshold, then the storage quota is nearly exceeded. In a further embodiment, an amount of metadata required to store data from the second request can be computed and summed with the amount of data from the second request; this sum can then be compared to the storage quota and used to compute a determination of whether the user entity should be provided a status indicating that the storage quota is nearly exceeded.

At decision block 630, it is determined from the comparison at operation 625 if the quantity of data from the second request exceeds the storage quota. Where the quantity of data from the second request is unable to be accepted by the data storage system because the free space available to the user entity is insufficient to accept that data, the data storage system returns a first status to the user entity at operation 635. This first status is to indicate to the user entity that data from the second request cannot be written to the data storage system. In an embodiment wherein the second request is a SCSI write request, this first status is a SCSI status code, such as a "Check Condition" status code. In such embodiments, the user entity can send a SCSI Request Sense command to obtain a KCQ from the data storage system; the KCQ includes more specific information about "Check Condition" status code (e.g., a vendor-specific or other code).

In addition to returning the first status, the data storage system fails to write data from the second request where the quantity of data from the second request exceeds the user entity's storage quota at operation 640. In one embodiment, failing the second request includes declining to accept data from a payload of the second request into one or more buffers of the data storage system. By declining to accept the data into one or more buffers, the data is ultimately discarded and therefore not written to the storage device underlying the VTL. Furthermore, subsequent requests from the user entity to write data to the data storage system will be failed until the storage quota for the user entity is increased (e.g., where an administrative entity increases the user entity's storage quota or the capacity of the underlying storage device is increased).

In one embodiment, operations 635 and 640 are transposed or occur contemporaneously. In an alternative embodiment of operations 635 and 640, a portion of the data from the second request is accepted and written to the data storage system where the data from the second request exceeds the storage quota but adequate free space is available to the user entity to accept that portion. In such an embodiment, the first status can indicate that a portion of the data is written to the data storage system but the remainder of the data has been failed—e.g., the first status (or a KCQ) can include a number of bytes accepted by the data storage system.

Where it is determined at decision block 630 that the quantity of data from the second request does not exceed the storage quota, the method 600 reaches decision block 645. At decision block 645, it is determined from the comparison at operation 625 if the quantity of data from the second request is sufficiently close to the storage quota (without exceeding it). Where the quantity of data from the second request causes data stored for the user entity in the data storage system to sufficiently approach the storage quota, the data storage system returns an early warning status to the user entity at operation 650. This early warning status is to indicate to the user entity that the quantity of data stored for the user entity in the data storage system is nearing the storage quota. In response, the user entity can take one or more actions to prevent write requests from failing at the data storage system—e.g., the user entity can close a virtual tape to which it is addressing requests, contact an administrative entity to increase the user entity's storage quota, and the like. In an embodiment wherein the second request is a SCSI write request, this early warning status is a SCSI status code, such as a "Check Condition" status code. In such embodiments, the user entity can send a SCSI Request Sense command to obtain a KCQ from the data storage system; the KCQ includes more specific information about "Check Condition" status code (e.g., a vendor-specific or other code).

In addition to returning the early warning status, the data storage system writes data from the second request to the underlying storage device at operation 655. In one embodiment, the data from the second is first accepted into one or more buffers of the data storage system. By accepting the data into one or more buffers, the data is ultimately written to the storage device underlying the VTL presented to the user entity. In one embodiment, operations 650 and 655 are transposed or occur contemporaneously.

Where it is determined at decision block 645 that the quantity of data from the second request does not sufficiently approach the storage quota, the data storage system continues to operate in a well-known manner. For example, the data storage system can continue to accept write requests from the user entity (which can cause the method 600 to revisit operation 615).

Figure 6B:
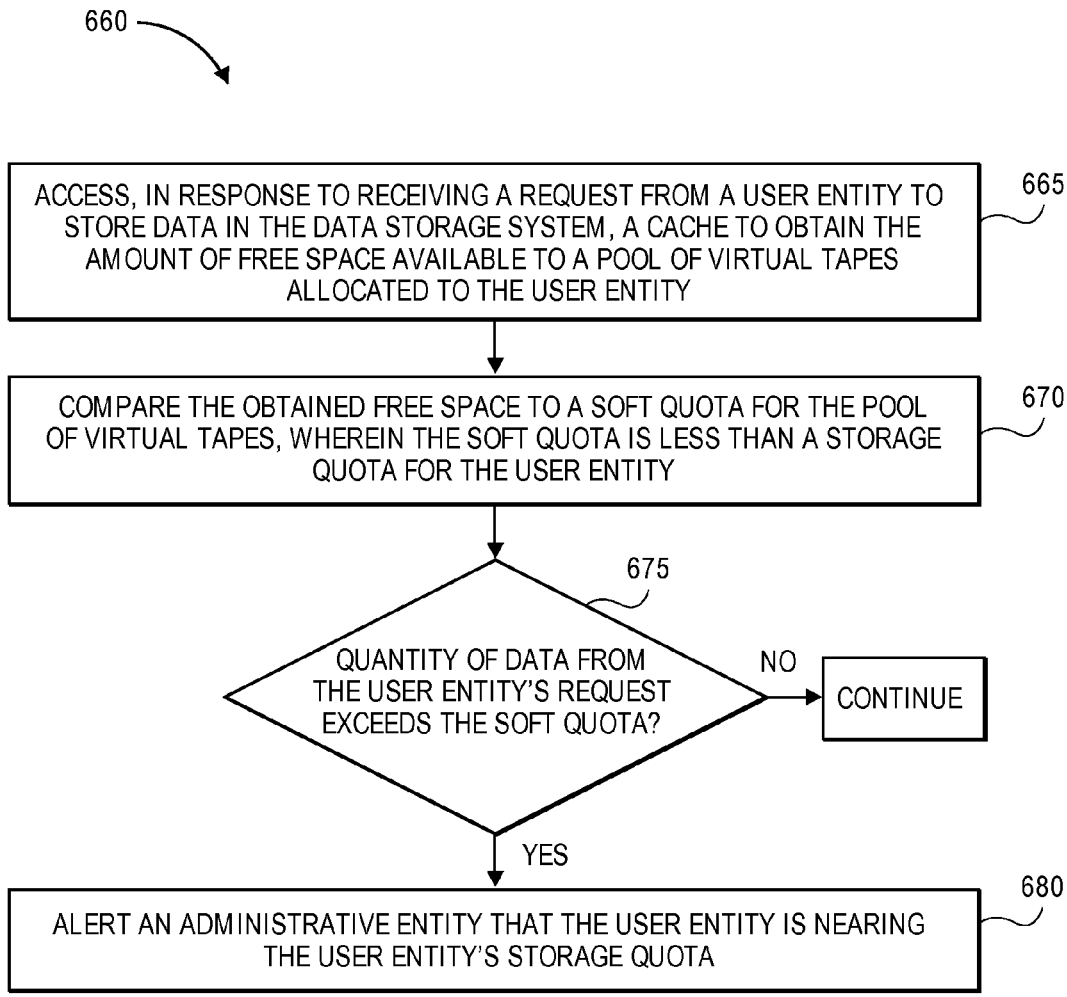
FIG. 6B is a flow diagram illustrating an embodiment of a method for alerting an administrative entity that a user entity is approaching a storage quota

Turning to FIG. 6B, a flow diagram illustrates a method 660 for alerting an administrative entity that a user entity is approaching its defined storage quota. The method 700 can be performed by the data storage system 207 of FIG. 2 and/or the storage appliance 328 of FIG. 3. The operations of FIG. 6B are illustrative and are not necessarily performed in the order depicted. Further, it is not necessary for all operations to be performed—some operations are absent from some embodiments.

To prevent a user entity from reaching the storage quota for an MTree, an embodiment includes an alert that can be provided to an administrative entity. The administrative entity can have control over a data storage system with which the user entity is interacting. To notify the administrative entity that the user entity is nearing its storage quota, the free space available in a user entity's MTree can be compared to the soft quota of the user entity's MTree.

Because the method 660 operates to alert an administrative entity rather than a user entity, many of the illustrated operations overlap with the operations of FIG. 6A's method 600. Further, operations described with respect to the method 660 can occur contemporaneously with the described in FIG. 6A.

Beginning first with operation 665, a cache is accessed, in response to receiving a request from a user entity to store data in the data storage system. The cache is accessed to obtain the amount of free space available to the pool of virtual tapes allocated to the user entity. The cache contains at least one entry for the MTree corresponding to the pool of virtual tapes allocated to the user entity. In one embodiment, the at least one entry additionally contains the storage quota and the soft quota for the MTree, and therefore the storage quota and the soft quota can also be obtained by accessing the cache. This operation 660 can be analogous to operation 620, described in FIG. 6A.

At operation 670, the obtained free space is compared to the soft quota. In some embodiments, this operation 670 requires one or more computations. In a simple embodiment, the quantity of data from the second request is subtracted from the obtained free space and if the difference is greater than zero but less than the difference between the storage quota and the soft quota, then the data from the second request exceeds the soft quota. In a further embodiment, an amount of metadata required to store data from the second request can be computed and summed with the amount of data from the second request; this sum can then be compared to the soft quota.

At decision block 675, it is determined from the comparison at operation 670 if the quantity of data from the request exceeds the soft quota. Where the quantity of data from the request causes data stored for the user entity in the data storage system to exceed the soft quota (and therefore approach the storage quota), the data storage system returns an alert to the administrative entity at operation 680. This alert is to indicate to the administrative entity that the quantity of data stored for the user entity in the data storage system is nearing the storage quota. In response, the administrative entity can take one or more actions to prevent write requests from failing for the user entity at the data storage system—e.g., the administrative entity can increase the user entity's storage quota or notify the user entity that it is approaching the storage quota. In an embodiment, this alert is provided to the administrative entity as a message, such as an email message.

Turning to FIG. 7, a flow diagram illustrates a method 700 for refreshing a cache in a data storage system. The method 700 can be performed by the data storage system 207 of FIG. 2 to refresh pool cache 215 and/or the storage appliance 328 of FIG. 3 to refresh pool cache 315. The operations of FIG. 7 are illustrative and are not necessarily performed in the order depicted. Further, it is not necessary for all operations to be performed—some operations are absent from some embodiments.

The cache referred to in FIG. 7 contains at least one entry corresponding to an MTree associated with a pool of virtual tapes allocated to a user entity. The cache entry includes data and/or metadata from the MTree so that requests to a file system of the data storage system can be reduced. In particular, the cache entry includes at least the free space available for the MTree—i.e., the free space available for the user entity to store data in the data storage system. In addition, the cache entry can include the storage quota and the soft quota for the user entity, both of which are stored in the MTree.

Beginning first with operation 705, the data storage system performing the method 700 refreshes a cache with a long interval (e.g., sixty seconds). To refresh the cache, a request is sent to a process of a file system that arranges files (and MTrees) in a storage device underlying a VTL of the data storage system. For example, an RPC request can be sent to a file system quota process of the file system, and the process can return the free space, the storage quota, and the soft quota. These returned values are used to populate the cache entry for the MTree of the user entity.

In the illustrated embodiment, the cache is initially refreshed with a long interval—where one interval has expired, a request is sent to the process on the file system to receive current information (e.g., the current free space, storage quota, and soft quota). The pool cache entry is then updated (or a new cache entry is created) with the current information from the file system process.

At operation 710, a cache access request is received. The cache access request can be received as part of an operation to receive data from a user entity, such as described with respect to FIG. 6A. Generally, the cache returns information (e.g., the current free space, storage quota, and soft quota) from an entry according to the user entity—i.e., the entry that corresponds to the MTree for the user entity attempting to write data to the data storage system. Operation 710 can be optional, and the method may proceed to decision block 715 even where a request to access the cache is absent.

One of the cache access request and the expiration of the long interval cause the method 700 to reach decision block 715. At decision block 715, the free space available to the MTree, and therefore the pool of virtual tapes, is evaluated. In one embodiment, the free space is evaluated by comparing it to a first threshold value, such as a value between 150 and 400 GB. If the free space is greater than this first threshold value, then the method proceeds to operation 720.

At operation 720, the long interval for refreshing the cache is maintained. Because the free space is greater than the first threshold, it can be inferred that the user entity is not approaching one or both of the storage quota and the soft quota for its MTree and thus frequent requests to the file system process to get the current free space are unnecessary.

In response to the cache access request, the free space for the pool of virtual tapes is returned from the cache entry at operation 750. In addition to the free space, one or both of the storage quota and the soft quota corresponding to the cache entry for the pool of virtual tapes (and its associated MTree) can be returned. Subsequently, the cache is perpetually refreshed according to the maintained long interval.

Alternatively, if the free space is determined to be less than a large amount (e.g., less than a threshold amount), the method 700 reached decision block 725. At decision block 725, the free space available to the MTree, and therefore the pool of virtual tapes, is again evaluated. In one embodiment, the free space is evaluated by comparing it to another threshold value, such as a value between one (1) and 100 GB. If the free space is less than this second threshold value, then the method proceeds to operation 730.

At operation 730, at least one entry in the cache is invalidated. A small amount of free space indicates that the user entity is approaching one or both of the storage quota and the soft quota for its MTree and thus frequent requests to the file system process to get the current free space are necessary. Therefore, the cache should be more frequently refreshed to ensure that the current information (e.g., free space, storage quota, and soft quota) is returned from the cache; the current information can prevent the user from reaching its storage quota, at which point write requests from the user entity will fail.

In one embodiment, at least one entry corresponding to the user entity's MTree is invalidated. However, if the cache includes multiple entries corresponding to the user entity's MTree (e.g., multiple entries corresponding to the same MTree, but having different time stamps), then all the entries can be invalidated. In another embodiment, all entries in the cache are invalidated—i.e., all entries for all MTrees in the cache, even if those MTrees are for different user entities. This other embodiment can be implemented where the physical space of the underlying storage in the data storage system is nearly completely consumed with stored data.

In connection with invalidating the cache, the cache is repopulated with current information at operation 735. As described above, a request (e.g., an RPC request) is sent to the file system process, and the process can return the free space, the storage quota, and the soft quota. These returned values are used to repopulate the cache entry for the MTree of the user entity.

At operation 740, the interval for refreshing the cache is shortened (e.g., to five seconds). Because the free space is less than the second threshold, it can be inferred that the user entity is approaching one of both of the storage quota and the soft quota for its MTree and thus frequent requests to the file system process to get the current free space are necessary to prevent the user entity from reaching the storage quota.

Again in response to the cache access request, the free space for the pool of virtual tapes is returned from the cache entry at operation 750. In addition to the free space, one or both of the storage quota and the soft quota corresponding to the cache entry for the pool of virtual tapes (and its associated MTree) can be returned. Subsequently, the cache is perpetually refreshed according to the shortened interval.

With reference to decision blocks 715 and 725, if the free space is determined to be less than a large amount but greater than a small amount, the method 700 proceeds to operation 745. At operation 745, the interval for refreshing the cache is shortened (e.g., to twenty seconds). Generally, this interval is less than the long interval, but greater than the shortened interval of operation 740. Because the free space is an intermediate amount—i.e., the free space is not so great that free space is not yet a concern, but neither is it so small that free space must be rapidly evaluated—moderately frequent requests to the file system process to get the current free space strike a balance between computational and temporal efficiency and robustly implementing quotas to prevent failing write requests from the user entity.

Again in response to the cache access request, the free space for the pool of virtual tapes is returned from the cache entry at operation 750. In addition to the free space, one or both of the storage quota and the soft quota corresponding to the cache entry for the pool of virtual tapes (and its associated MTree) can be returned. Subsequently, the cache is perpetually refreshed according to the interval set at operation 745.

Although the operations of the method 700 have been described in a sequential order, one of ordinary skill in the art would recognize that this order is merely illustrative. Some operations can be transposed, such as determining whether there is a small amount of free space and determining whether there is a large amount of free space, without substantively modifying the method 700. In another embodiment, a third threshold can be introduced to determine if there is an intermediate amount of free space for the pool of virtual tapes. This third threshold can be introduced between decision block 725 and operation 745.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known circuits, structures, devices, and operations have been shown in block diagram form or without detail in order to avoid obscuring the understanding of the description. Where considered appropriate, reference numerals or terminal portions of reference numerals have been repeated among the figures to indicate corresponding or analogous elements, which may optionally have similar characteristics.

Various operations and methods have been described. Some of the methods have been described in a basic form in the flow diagrams, but operations may optionally be added to and/or removed from the methods. In addition, while the flow diagrams show a particular order of the operations according to example embodiments, it is to be understood that that particular order is exemplary. Alternate embodiments may optionally perform the operations in different order, combine certain operations, overlap certain operations, etc. Many modifications and adaptations may be made to the methods and are contemplated.

One or more embodiments include an article of manufacture (e.g., a computer program product) that includes a machine-accessible and/or machine-readable medium. The medium may include a mechanism that provides, for example stores or transmits, information in a form that is accessible and/or readable by the machine. The machine-accessible and/or machine-readable medium may provide, or have stored thereon, a sequence of instructions that if executed by a machine cause or result in the machine performing one or more operations, methods, or techniques disclosed herein.

In one embodiment, the machine-readable medium may include a tangible non-transitory machine-readable storage media. For example, the tangible non-transitory machine-readable storage media may include a floppy diskette, an optical storage medium, an optical disk, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, or a combinations thereof. The tangible medium may include one or more solid or tangible physical materials, such as, for example, a semiconductor material, a phase change material, a magnetic material, etc.

In another embodiment, the machine-readable media may include a non-tangible transitory machine-readable communication medium. For example, the transitory machine-readable communication medium may include electrical, optical, acoustical or other forms of propagated signals, such as carrier waves, infrared signals, digital signals, etc.)

Examples of suitable machines include, but are not limited to, computer systems, desktops, laptops, network elements, storage appliances, equipment of remote archive repositories, and other electronic devices, equipment, elements, or systems having one or more microprocessors. Such electronic devices typically include one or more processors coupled with one or more other components, such as one or more storage devices (non-transitory machine-readable storage media), user input/output devices (e.g., a keyboard, a touchscreen, and/or a display), and/or network connections. The coupling of the processors and other components is typically through one or more buses/interconnects and bridges (also termed bus controllers). Thus, the storage device of a given electronic device may store code and/or data for execution on the one or more processors of that electronic device.

It should also be appreciated that reference throughout this specification to "one embodiment," "an embodiment," or "one or more embodiments," for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A method executed by a storage system for enforcing storage limits, comprising:
   receiving a first request that is to define a storage quota for a pool of virtual tapes that is allocated to a user entity and is presented to the user entity as physical tape storage, wherein the storage quota is defined by a maximum number of bytes that can be stored into the pool of virtual tapes for the user entity;
   defining the storage quota for the pool of virtual tapes according to the first request, wherein the defined storage quota limits a quantity of data that the user entity can store in physical storage of the storage system, wherein the physical storage is to store data corresponding to a virtual tape of the pool;
   receiving a second request from the user entity to write data to the virtual tape of the pool of virtual tapes; and
   in response to a quantity of the data from the user entity's second request exceeds the maximum number of bytes that can be stored into the pool of virtual tapes for the user entity:
   returning a first status that indicates the data to be written from the second request cannot be written; and failing the user entity's second request to write the data to the virtual tape of the pool of virtual tapes such that the data of the second request is not stored in the physical storage.

2. The method of claim 1, further comprising:
accessing a cache, in response to receiving the second request, to obtain an amount of free space available to the pool of virtual tapes;
comparing the obtained amount of free space to the quantity of the data from the user entity's second request; and
in response to the quantity of the data from the user entity's second request nears the amount of free space but does not exceed the amount of free space:
returning an early warning status based on the comparison of the obtained amount of free space to the quantity of the data from the user entity's second request that is to indicate whether data written according to requests from the user entity is nearing the storage quota; and
writing the data from the user entity's second request to the physical storage.

3. The method of claim 2, wherein returning the early warning status comprises:
returning the early warning status in response to a result of subtracting the quantity of the data from the user entity's second quest from the amount of free space is less than or equal to a difference of a predetermined quantity subtracted from the storage quota.

4. The method of claim 2, further comprising:
refreshing the cache based on a previous state of the cache.

5. The method of claim 4, wherein refreshing the cache comprises:
evaluating the amount of free space to determine an interval at which the cache is to be refreshed; and
refreshing the cache at the determined interval.

6. The method of claim 2, further comprising:
requesting the amount of free space, the storage quota and a soft quota using a remote procedure call (RPC) function to a file system in the storage system; and
receiving, in response to the RPC request, the amount of free space, the storage quota and the soft quota.

7. The method of claim 1, wherein the second request is a Small Computer System Interface (SCSI) request.

8. The method of claim 2, wherein the first status and the early warning status are SCSI status codes.

9. The method of claim 2, further comprising:
comparing the obtained amount of free space to a soft quota for the pool of virtual tapes, wherein the soft quota is less than the storage quota; and
providing an alert to an administrative entity based on the comparison of the obtained amount of free space to the soft quota that is to indicate whether data written according to requests from the user entity is nearing the storage quota.

10. A non-transitory computer-readable storage medium having instructions stored therein, which when executed by a computer, cause the computer to perform a method, the method comprising:
receiving a first request that is to define a storage quota for a pool of virtual tapes that is allocated to a user entity, the pool of virtual tapes presented to the user entity as physical tape storage;
defining the storage quota for the pool of virtual tapes according to the first request, wherein the defined storage quota limits a quantity of data that the user entity can write to the pool of virtual tapes;
receiving a second request from the user entity that is to write data to a virtual tape of the pool of virtual tapes; and
returning a first status that indicates the data to be written according to the second request cannot be written to the virtual tape in response to a quantity of the data according to the user entity's second request exceeds the defined storage quota.

11. The non-transitory computer-readable storage medium of claim 10, wherein the method further comprises:
accessing a cache, in response to receiving the second request, to obtain an amount of free space available to the pool of virtual tapes;
comparing the obtained amount of free space to the quantity of the data according to the user entity's second request; and
in response to the quantity of the data according to the user entity's second request nears the amount of free space, but does not exceed the amount of free space:
returning an early warning status based on the comparison of the obtained amount of free space to the quantity of the data according to the user entity's second request that is to indicate whether data written according to requests from the user entity is nearing the storage quota; and
writing the data from the user entity's second request to the physical storage.

12. The non-transitory computer-readable storage medium of claim 11, wherein returning the early warning status comprises:
returning the early warning status in response to a result of subtracting the quantity of the data according to the user entity's second request from the amount of free space is less than or equal to a difference of a predetermined quantity subtracted from the storage quota.

13. The non-transitory computer-readable storage medium of claim 11, wherein the method further comprises:
refreshing the cache based on a previous state of the cache.

14. The non-transitory computer-readable storage medium of claim 13, wherein refreshing the cache comprises:
evaluating the amount of free space to determine an interval at which the cache is to be refreshed; and
refreshing the cache at the determined interval.

15. The non-transitory computer-readable storage medium of claim 11, wherein the method further comprises:
requesting the amount of free space, the storage quota and a soft quota using a remote procedure call (RPC) function to a file system in the storage system; and
receiving, in response to the RPC request, the amount of free space, the storage quota and the soft quota.

16. The non-transitory computer-readable storage medium of claim 10, wherein the second request is a Small Computer System Interface (SCSI) request.

17. The non-transitory computer-readable storage medium of claim 11, wherein the first status and the early warning status are SCSI status codes.

18. A data storage system, comprising:
a virtual tape library for a user entity having a virtual tape drive and a pool of virtual tapes to be loaded into the virtual tape drive and configured to be presented as physical tape;
a mass storage device configured to provide persistent storage for the data storage system wherein a first request for a first virtual tape loaded into the virtual tape drive is to be stored in the mass storage device; and
a processor to execute an interface module configured to receive a plurality of requests; a virtual tape write module configured to write the first request for the first virtual tape loaded into the virtual tape drive to the mass storage device; a quota definition module configured to define a storage quota for the pool of virtual tapes according to a second request received by the interface module, wherein the defined storage quota limits an amount of data that the user entity can write to the mass storage device; and a quota alert module configured to provide an status to the user entity that indicates a write request received by the interface module is unable to be written to the mass storage device where an amount of data from the write request would cause an amount of data stored for the user entity in the mass storage device to exceed the storage quota.

19. The data storage system of claim 18, wherein the quota alert module is further configured to access a cache, in response to receiving the write request, to obtain an amount of free space available to the pool of virtual tapes; to compare the obtained amount of free space to the amount of data from the write request; and, in response to the amount of data from the write request nears the amount of free space, but does not exceed the amount of free space, (1) return an early warning status based on the comparison of the obtained amount of free space to the amount of data from the write request that is to indicate whether data written according to requests from the user entity is nearing the storage quota, and (2) write the data from the write request to the mass storage device.

20. The data storage system of claim 19, wherein to return the early warning status comprises:
to return the early warning status in response to a result of subtracting the amount of data from the write request from the amount of free space is less than or equal to a difference of a predetermined amount subtracted from the storage quota.

21. The data storage system of claim 19, wherein the quota alert module is further configured to refresh the cache based on a previous state of the cache.

22. The data storage system of claim 21, wherein to refresh the cache comprises:
to evaluate the amount of free space to determine an interval at which the cache is to be refreshed; and
to refresh the cache at the determined interval.

23. The data storage system of claim 19, wherein the quota alert module is further configured to request the amount of free space, the storage quota and a soft quota using a remote procedure call (RPC) function to a file system in the data storage system; and to receive, in response to the RPC request, the amount of free space, the storage quota and the soft quota.

24. The data storage system of claim 19, wherein the write request is a Small Computer System Interface (SCSI) request.

25. The data storage system of claim 19, wherein the status and the early warning status are SCSI status codes.

* * * * *